United States Patent [19]

Neubauer

[11] Patent Number: 5,728,335
[45] Date of Patent: Mar. 17, 1998

[54] PROCESS FOR EXTRUSION

[75] Inventor: Anthony Charles Neubauer, Piscataway, N.J.

[73] Assignee: Union Carbide Chemicals & Plastics Technology Corporation, Danbury, Conn.

[21] Appl. No.: 671,166

[22] Filed: Jun. 26, 1996

[51] Int. Cl.[6] .................................................. B29B 9/06
[52] U.S. Cl. ........................... 264/83; 264/564; 264/85; 264/141; 264/211.24; 425/205
[58] Field of Search ........................ 264/211.24, 83, 264/85, 564, 141; 425/205

[56] References Cited

U.S. PATENT DOCUMENTS

| | | | |
|---|---|---|---|
| 4,302,565 | 11/1981 | Goeke et al. | 526/88 |
| 4,528,151 | 7/1985 | Matsuo et al. | 264/85 |
| 4,814,135 | 3/1989 | Heitz | 264/564 |
| 4,890,996 | 1/1990 | Shimizu | 425/205 |
| 5,284,613 | 2/1994 | Ali et al. | 264/331.17 |
| 5,458,474 | 10/1995 | Neubauer et al. | 425/205 |
| 5,539,076 | 7/1996 | Nowlin et al. | 526/348.1 |

FOREIGN PATENT DOCUMENTS 700769  3/1996  European Pat. Off. .

*Primary Examiner*—Jeffery R. Thurlow
*Attorney, Agent, or Firm*—Saul R. Bresch

[57] ABSTRACT

A process for the extrusion of polyethylene having a broad molecular weight distribution wherein the polyethylene is prepared in pellet form, said extrusion taking place in a pelletizing extruder having one or more zones essentially filled with polyethylene and two or more zones partially filled with polyethylene including (i) introducing the polyethylene into the extruder at a temperature sufficient to melt the polyethylene; (ii) introducing a mixture of an inert gas and oxygen into each partially filled zone wherein the mixture contains about 1 to about 21 percent by volume oxygen based on the volume of the gaseous mixture; (iii) passing the molten polyethylene through each zone at melt temperature; and (iv) extruding the polyethylene into pellets and cooling same.

10 Claims, No Drawings

PROCESS FOR EXTRUSION

TECHNICAL FIELD

This invention relates to a process for the extrusion of polyethylene into pellets useful in the production of blown film.

BACKGROUND INFORMATION

Ziegler-type catalysts have undergone development over the years to improve the economy and quality of various polyethylene products. This development has tended towards narrowing the molecular weight distribution of the resin; however, narrow molecular weight distributions are not desirable for blown film resins, i.e., the narrow molecular weight distribution does not improve the processability of the resins into blown film in terms of bubble stability. Rather, bubble stability is a characteristic of broad molecular weight distribution resins.

A particularly good technique for producing broad molecular weight distribution polyethylenes is through the use of a two stage polymerization process similar to those mentioned in U.S. Pat. Nos. 5,047,468 and 5,149,738. Briefly, this process is one for the in situ blending of polymers wherein an ethylene copolymer is prepared in a high melt index reactor and an ethylene copolymer is prepared in a low melt index reactor, the two reactors being connected in series. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 3000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 14 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:

(1) the alpha-olefin is present in a ratio of about 0.02 to about 3.5 moles of alpha-olefin per mole of ethylene; and (2) hydrogen is present in a ratio of about 0.05 to about 3 moles of hydrogen per mole of combined ethylene and alpha-olefin;

(d) in the low melt index reactor:

(1) the alpha-olefin is present in a ratio of about 0.02 to about 3.5 moles of alpha-olefin per mole of ethylene; and (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the resins produced by these two stage processes can be turned into products having superior mechanical strength and other advantageous physical and chemical characteristics, the resins generally do not achieve a high level of bubble stability.

It is well known that one way to achieve this characteristic is to tailor the broad molecular weight distribution resin after it is produced. Tailoring is simply controlled light crosslinking, which can be used in the fabrication of fibers, films, molded products, and the like to provide products having excellent physical and chemical properties for particular applications. It is often achieved by the use of additives, which are homogenized, alloyed and/or combined with the resin through various extrusion/mixing/pelletizing systems. In many cases, the additive is a critical factor in the commercial success of the final product.

Useful tailoring additives are free radical generators such as organic peroxides and oxygen. Unfortunately, excessive amounts of free radical generators can cause chain scission, which is characterized by a rupture of chemical bonds in the backbone and side chains of the polymer. The result is a decrease in the solid state strength of the resin product. Thus, the amount of free radical generator must be carefully controlled. In addition, organic peroxides increase operating costs because of the cost of the peroxides; additional equipment needed to safely handle the peroxides; and the presence of undesirable by-products, particularly when the tailored polymer will be used in FDA applications. In the case of oxygen tailoring, when melt temperatures become to high, the solid state strength of the blown film becomes unacceptably low. Also, high amounts of oxygen, e.g., 21 percent based on the volume of the gases used in extrusion systems, are often required due to the design of the equipment. But too much oxygen in the presence of unmelted polymer in the form of granules or powders can lead to dust explosions.

DISCLOSURE OF THE INVENTION

An object of this invention, therefore, is to provide a process for the tailoring of broad molecular weight distribution polyethylene whereby processability is enhanced in terms of bubble stability and high solid state strength is achieved in blown film while avoiding the drawbacks of the organic peroxides, and the high melt temperature and dust explosion problems of oxygen. Other objects and advantages will become apparent hereinafter.

According to the present invention such a process has been discovered. The process is one for the extrusion of polyethylene having a broad molecular weight distribution wherein the polyethylene is prepared in pellet form, said extrusion taking place in a pelletizing extruder having one or more zones essentially filled with polyethylene and two or more zones partially filled with polyethylene comprising (i) introducing the polyethylene into the extruder at a temperature sufficient to melt the polyethylene; (ii) introducing a mixture of an inert gas and oxygen into each partially filled zone wherein the mixture contains about 1 to about 21 percent by volume oxygen based on the volume of the gaseous mixture; (iii) passing the molten polyethylene through each zone at melt temperature; and (iv) extruding the polyethylene into pellets and cooling same.

DESCRIPTION OF THE PREFERRED EMBODIMENT(S)

As noted, the polyethylene is preferably produced in two staged reactors connected in series wherein a mixture of resin and catalyst precursor is transferred from the first reactor to the second reactor in which another copolymer is prepared and blends in situ with the copolymer from the first reactor. The polyethylene can also be produced in one reactor as described, for example, in U.S. Pat. No. 4,302, 565, or in three or more reactors provided that a broad molecular weight distribution polyethylene is made by the process.

The resin can be extruded into pellets in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the pellets are single screw and multiscrew types. A typical pelletizing extruder can be illustrated by a two stage twin screw melter/mixer with a feed section and a vent section, a gear pump, a pelletizing device, and various other sections. Another typical pelletizing extruder can be illustrated by a two stage single screw extruder. Thus, the term "extruder", as used in this specification, is considered to include conventional extruders and mixers, both of which are adapted to form pellets. A typical single screw type extruder can be described as one having a hopper at its upstream end and a die at its downstream end. The hopper feeds into a barrel, which contains a screw. At the downstream end, between the end of the screw and the pellet forming die, is a screen pack and a breaker plate. The screw portion of the two stage extruder is considered to be divided up into many sections, a feed section, a compression section, a metering section, which is followed by another feed section or a vent section, another compression section, a final metering section, and multiple heating sections from the rear heating section to the front heating section, the multiple heating-sections running from upstream to downstream. There can be one or more vent sections. If the extruder has more than one barrel, the barrels are connected in series. The length to diameter ratio of typical single screw extruders is in the range of about 16:1 to about 36:1, and the length to diameter ratio of typical twin screw mixers is in the range of about 5:1 to about 30:1.

In the process of this invention, the extrusion is carried out at a temperature sufficient to melt the resin. The extrusion generally takes place at temperatures in the range of about 140 to about 320 degrees C., and is preferably carried out at temperatures in the range of about 160 to about 280 degrees C. The temperature in the extruder is also sufficient to maintain the resin in the molten state until the pellets are formed and cooled.

In twin screw mixer/gear pump extrusion systems, which are typically starved fed, i.e., the feed section is partially filled, polymer temperature can be controlled by controlling the speed of the mixer, by adjusting feed rate, by adjusting mixing/temperature/residence time control devices, i.e., commercially available control devices uniquely designed by each twin screw manufacturer which are commonly referred to as "gate position" in Kobe™ LCM twin screw mixers, "slot position" in JSW™ CMP twin screw mixers, etc., and by adjusting gear pump suction pressure. U.S. Pat. No. 4,452,750. Typically, increasing speed, decreasing feed rate, closing "mixing" control devices, and increasing gear pump suction pressure increases polymer temperature. It should be noted that in high capacity twin screw mixers, barrel metal temperature has only a minor effect on polymer temperature. This phenomenon is due to the low overall heat transfer coefficient of polymers, i.e., polymers are typically good insulators.

In two stage single screw extruders, which are typically flood fed, i.e., the feed section is essentially filled with particulate (unmolten) polymer, temperature control is typically adjusted by screw speed, extruder discharge pressure and barrel temperatures. In contrast to high capacity twin screw mixers, the overall capacity of single screw extruders is much lower on a rate to barrel diameter basis and therefore barrel temperature control has an increased effect on polymer temperature.

In flood fed extruders, although the feed section is filled with particulate polymer, typically in granular or pellet form, the gaseous mixture can still be successfully introduced due to the porosity of the particulates. In fact, depending on the design of the feed section, the flow rate of the gaseous mixture may need to be controlled to insure that the particulates in the feed section are not inadvertently fluidized, possibly reducing the overall capacity of the extruder.

For the purposes of this specification, the zones of the pelletizing extruder have been divided into essentially filled zones and partially filled zones. The "essentially" filled zones are those sections of the extruder that are almost completely filled with polyethylene, usually in the molten state. The "partially" filled zones are those sections of the extruder that are partially filled with polyethylene. In the feed section, the polyethylene is in particulate form. In other sections, the polyethylene is generally in a molten state. The term "partially" filled means that about 5 to about 95 percent of the zone (on a volume basis) is filled with polyethylene. Preferably about 5 to about 40 percent of the zone is filled, and most preferably about 10 percent of the zone is filled with polyethylene. In starved fed extruders, the partially filled zones are generally the feed and vent sections. The zones, other than the partially filled zones, are operated as essentially filled zones.

The atmosphere in the partially filled zones is a mixture of an inert gas (such as nitrogen) and oxygen wherein the oxygen can be present in the range of about 1 to about 21 percent by volume based on the volume of the gaseous mixture, and is preferably in the range of about 1 to about 4 percent by volume. The preferred method for controlling the oxygen concentration is by continuously mixing air and nitrogen via flow control valves to achieve the desired oxygen concentration and continuously replenishing the partially filled sections with the newly made gas mixture.

In order to reduce the cost and keep the tailoring operation as simple as possible, which, in turn, usually improves the overall operation, like gaseous mixtures can be simultaneously introduced into each partially filled zone. Alternatively, depending on the degree of tailoring required, gaseous mixtures with higher or lower oxygen concentrations can be separately introduced into each partially filled zone.

It will be understood that the design and operation of each extrusion system will depend on the resin to be processed, the desired through-put rates, and the desired properties of the ultimate product. In general, however, the design and operation will be conventional provided that the requirements of subject invention are met.

The polyethylene used in the process of the invention has a broad molecular weight distribution, which is reflected in an Mw/Mn ratio of about 2 to about 44, preferably about 10 to about 30. Mw is the weight average molecular weight; Mn is the number average molecular weight; and the Mw/Mn ratio can be referred to as the polydispersity index, which is a measure of the breadth of the molecular weight distribution.

As noted above, the process of the invention enhances the bubble stability of the polyethylene while maintaining acceptable solid state strength of the blown film in terms of dart drop strength.

High speed extrusion bubble stability is an important factor in blown film extrusion processes. A blown film extrusion process is one in which molten polymer is forced through an annular die to form a continuous cylindrical tube. Outside the die, the tube is blown out to a larger diameter than the die diameter, cooled by an air ring, and then flattened before wind-up. The ratio of the final diameter of the cylindrical tube to the diameter of the annulus is called the blow-up ratio (BUR). The combination of the extrusion rate, BUR, and the speed with which the tube is drawn out determines the final film thickness. The ability to produce thinner films at higher rates of extrusion is governed by many factors including the molecular and rheological characteristics of the molten polymer, dependence of properties on temperature, and the design of the air ring.

The entire cylindrical tube between the die and the collapsing frame (where the tube is flattened) is called the "bubble". This is a cylindrical bubble in contrast to traditionally familiar spherical bubbles in which air, or some other gas, is enveloped by a thin liquid film. Here, air is used to blow a thin molten polymer film. Although the cross-section (circular) of the bubble does not change, the bubble looks conical from the outside because of a change in the diameter until the solidification at the frost-line height (FLH). Sometimes, e.g., with high density polyethylene, the bubble looks like a cylindrical semi-molten tube with a diameter approximately equal to the ring diameter before being blown out into a larger diameter. Past the FLH, however, the shape does not change from a circular cylindrical tube of constant diameter. Note that between the die and the FLH the bubble is always semi-molten.

One would like to produce a final film with close tolerance in film thickness under stable conditions of operation, i.e., the shape of the bubble remains the same without any change over time. The highest extrusion rate and the highest wind-up speed that can be used without changing the shape of the bubble provides the operating constraints for a given resin in a given system (extruder, air ring, cooling air temperature, etc.). For example, at a given extrusion rate, if one can increase the wind-up speed to make thinner film without losing the shape of the bubble, then the resin is said to have good high speed extrusion bubble stability.

Often, the bubble stability within a given extrusion system is directly related to the molecular characteristics which influence the behavior of the bubble. For example, it is easier to stretch chewing gum into a very thin thread without breakage than a rubber band. A rubber band stiffens as it is stretched and, beyond a certain point, it will break. However, the stiffening of the rubber band also gives it better stability since it will be less sensitive to external disturbances. This is not the case with the chewing gum since it deforms very easily and is very sensitive to disturbances. In the blown film concept, one would like to have rubber band behavior as the bubble is being blown and stretched rather than a chewing gum behavior. In this invention, the addition of oxygen in the two or more partially filled zone has been found to provide better high speed extrusion bubble stability, i.e., the film can be drawn at higher wind-up speeds to produce thinner films. Further, when the resin pellets are subjected to conventional blown film extrusion, the dart drop strength of the blown film is also improved. Dart drop strength is measured in accordance with ASTM D-1709. The dart drop is reported in grams for a given film thickness. The combination of enhanced bubble stability and dart drop strength is unexpected.

The preferred two stage process can be described as follows:

The copolymers produced in each of the reactors are copolymers of ethylene and at least one alpha-olefin comonomer having 3 to 8 carbon atoms, preferably one or two alpha-olefin comonomers. The alpha-olefins can be, for example, propylene, 1-butene, 1-hexene, 4-methyl-1-pentene, and 1-octene.

It will be understood that the in situ blend can generally be characterized as a bimodal resin. In some cases, however, it is difficult to distinguish two peaks. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

Various transition metal catalyst systems can be used to provide the polyethylenes used in subject process. One is a magnesium/titanium based catalyst system, which can be exemplified by the catalyst system described in U.S. Pat. No. 4,302,565. The precursor can be supported or unsupported. Another catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. This is described in U.S. Pat. No. 5,290,745. Metallocene catalyst systems such as those described in U.S. Pat. Nos. 5,317,036 and 5,272,236 can also be used. In the case of these metallocene catalyst systems, the melt flow ratio can be about 14 to about 70.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer can be prepared in the first reactor. The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium. Alternatively, the low molecular weight copolymer can be prepared in the first reactor and the high molecular weight copolymer can be prepared in the second reactor.

In the high molecular weight reactor:

Because of the low values, instead of melt index, flow index is determined and those values are used in this specification. The flow index can be in the range of about 0.01 to about 30 grams per 10 minutes, and is preferably in the range of about 0.1 to about 20 grams per 10 minutes. The molecular weight of this polymer is, generally, in the range of about 135,000 to about 550,000. The density of the copolymer can be at least 0.860 gram per cubic centimeter, and is preferably in the range of 0.900 to 0.940 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 1 to about 3000 grams per 10 minutes, and is preferably in the range of about 50 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.975 gram per cubic centimeter. The melt flow ratio of this copolymer can be in the range of about 20 to about 70, and is preferably about 20 to about 45.

The blend or final product, as removed from the second reactor, can have a melt index in the range of about 0.02 to about 3.5 grams per 10 minutes, and preferably has a melt index in the range of about 0.04 to about 2.0 grams per 10 minutes. The melt flow ratio can be in the range of about 30 to about 160, and is preferably in the range of about 30 to about 125. The molecular weight of the final product is, generally, in the range of about 90,000 to about 550,000. The density of the blend is at least 0.915 gram per cubic centimeter, and is preferably in the range of 0.916 to 0.960 gram per cubic centimeter.

The weight ratio of copolymer prepared in the high molecular weight reactor to copolymer prepared in the low molecular weight reactor can be in the range of about 0.67:1 to about 2:1, and is preferably in the range of about 0.75:1 to about 1.6:1. This is also known as the split.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor, i.e., the first reactor:

The mole ratio of alpha-olefin to ethylene can be in the range of about 0.01:1 to about 0.4:1, and is preferably in the range of about 0.02:1 to about 0.3:1. The mole ratio of hydrogen (if used) to ethylene can be in the range of about 0.001:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor, i.e., the second reactor:

The mole ratio of alpha-olefin (if used) to ethylene can be in the range of about 0.005:1 to about 0.6:1, and is preferably in the range of about 0.01:1 to about 0.42:1. The mole ratio of hydrogen to ethylene can be in the range of about 0.2:1 to about 3:1, and is preferably in the range of about 1:1 to about 2.2:1. The operating temperature is generally in the range of about 70° C. to about 110° C. As mentioned above, the temperature is preferably varied with the desired density.

The pressure, i.e., the total pressure in the reactor, can be in the range of about 200 to about 450 psi and is preferably in the range of about 280 to about 400 psig. The ethylene partial pressure in the first reactor is at least about 25 psi and is preferably at least about 30 psi. The upper limit of ethylene partial pressure in the first reactor and the ethylene partial pressure in the second reactor are set according to the amount of copolymer it is desired to produce in each of these reactors, i.e., to achieve the split mentioned above. It is noted that increasing the ethylene partial pressure in the first reactor leads to an increase in ethylene partial pressure in the second reactor. Generally, the ethylene partial pressure roughly doubles in the second reactor over the first reactor. The balance of the total pressure is provided by alpha-olefin other than ethylene and an inert gas such as nitrogen.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst, and resin in each fluidized bed can be in the range of about 1 to about 12 hours and is preferably in the range of about 1.5 to about 5 hours.

The advantages of the invention are found in the film prepared from the broad molecular weight distribution resin in the ease of processability brought about by the enhanced high speed extrusion bubble stability and the solid state strength of the blown film. Thus, the resin can be extruded to thinner gauges at higher extrusion speeds, and the resulting film has an enhanced dart drop strength.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents mentioned in this specification are incorporated by reference herein.

The invention is illustrated by the following examples.

EXAMPLES 1 to 4

A titanium trichloride catalyst precursor is prepared in a 1900 liter vessel equipped with pressure and temperature controls and a turbine agitator. A nitrogen atmosphere (less than 5 ppm $H_2O$) is maintained at all times.

1480 liters of anhydrous tetrahydrofuran (THF) containing less than 40 ppm $H_2O$ are added to the vessel. The THF is heated to a temperature of 50 degrees C, and 1.7 kilograms of granular magnesium metal (70.9 gram atoms) are added, followed by 27.2 kilograms of titanium tetrachloride (137 mols). The magnesium metal has a particle size in the range of from 0.1 to 4 millimeters. The titanium tetrachloride is added over a period of about one-half hour.

The mixture is continuously agitated. The exotherm resulting from the addition of titanium tetrachloride causes the temperature of the mixture to rise to approximately 72 degrees C over a period of about three hours. The temperature is held at about 70 degrees C by heating for approximately another four hours. At the end of this time, 61.7 kilograms of magnesium dichloride (540 mols) are added and heating is continued at 70 degrees C for another eight hours. The mixture (solution) is then filtered through a 100 micron filter to remove undissolved magnesium dichloride and unreacted magnesium (less than 0.5 percent by weight).

100 kilograms of fumed silica having a particle size in the range of from 0.1 to 1 microns are added to the mixture prepared above over a period of about two hours. The mixture is stirred by means of a turbine agitator during this time and for several hours thereafter to thoroughly disperse the silica in the solution. The temperature of the mixture is held at 70 degrees C throughout this period and a nitrogen atmosphere is maintained at all times.

The resulting slurry is spray dried using an 8-foot diameter closed cycle spray dryer equipped with a rotary atomizer. The rotary atomizer is adjusted to give catalyst particles with a D50 of 12 microns. The scrubber section of the spray dryer is maintained at approximately minus 4 degrees C..

Nitrogen gas is introduced into the spray dryer at an inlet temperature of 140 degrees C and is circulated at a rate of approximately 1700 kilograms per hour. The catalyst slurry is fed to the spray dryer at a temperature of about 35 degrees C and a rate of 90 to 95 kilograms per hour, or sufficient to yield an outlet gas temperature of approximately 100 degrees C. The atomization pressure is slightly above atmospheric. Discrete spray dried catalyst precursor particles are formed.

The spray dried catalyst contains 2.5 weight percent Ti, 6.3 weight percent Mg, and 29.2 weight percent THF. The particles have a D10 of 8 microns, a D50 of 12 microns, and a D90 of 18.6 microns as determined by means of a Leeds and Northrup Microtrac™ particle size analyzer using a dodecane solvent.

The discrete catalyst precursor particles are mixed with mineral oil under a nitrogen atmosphere in a 400 liter vessel equipped with a turbine agitator to form a slurry containing approximately 28 weight percent of the solid catalyst precursor. A 50 weight percent solution of tri-n-hexylaluminum in mineral oil is added and the slurry is stirred for one hour. The tri-n-hexylaluminum solution is employed in an amount sufficient to provide 0.2 mol of tri-n-hexylaluminum per mol of THF in the catalyst. A 30 weight percent solution of diethylaluminum chloride (DEAC) in mineral oil is then added and the mixture is stirred for another hour. The DEAC is employed in an amount sufficient to provide 0.45 mol of DEAC per mol of THF in the catalyst.

Ethylene is copolymerized with 1-hexene in each of two fluidized bed reactors. The total pressure in each reactor is 300 psia. Each polymerization is continuously conducted after equilibrium is reached under conditions set forth in Table I. Polymerization is initiated in the first reactor by continuously feeding the above catalyst precursor and cocatalyst triethylaluminum (TEAL) into a fluidized bed of polyethylene granules together with ethylene, 1-hexene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene, and hydrogen are introduced into the second reactor where the gases come into contact with the copolymer and catalyst from the first reactor. Additional cocatalyst is also introduced. The product blend, in granular form, is continuously removed.

Table I sets forth polymerization conditions and resin properties.

TABLE I

|  | first reactor | second reactor | final product |
|---|---|---|---|
| reaction conditions |  |  |  |
| temperature (°C.) | 85 | 110 | — |
| comonomer | 1-hexene | 1-hexene | — |
| C2 partial pressure (psia) | 30 | 72 | — |
| H2/C2 molar ratio | 0.028 | 1.8 | — |
| comonomer/C2 molar ratio | 0.034 | 0.015 | — |
| catalyst feeder (rpm) | 8000 | — | — |
| precursor feed (lbs/hr) | 0.029 | — | — |
| TEAL feed rate (cc/hr) | 250 | 170 | — |
| resin properties |  |  |  |
| production rate (lbs/hr) | 30 | 20 | — |
| bed weight (lbs) | 85 | 120 | — |
| residence time (hrs) | 2.83 | 2.4 | — |
| flow index (g/10 min) | 0.45 | 28000 | 8 |
| melt index (g/10 min) | 0.16 | 1000 | 0.065 |
| density (g/cc) | 0.930 | 0.968 | 0.948 |
| melt flow ratio | 28 | 28 | 123 |
| residual titanium (ppm) | 5 | — | 3 |
| bulk density (lbs/cu ft) | 24 | — | 28 |
| average particle size (inch) | 0.022 | — | 0.022 |
| polydispersity (Mw/Mn) | — | — | 12 |
| split ratio (wt %) | 0.6 | 0.4 | — |

The resin described above is introduced into a two stage KOBE™ LCM twin screw melter/mixer having two partially filled zones (the feed zone and a vent zone), a gear pump, and a pelletizing device (the entire apparatus is hereinafter referred to as an extruder). In examples 1 and 2 the throughput rate is 380 pounds per hour and in examples 3 and 4, the throughput rate is 505 pounds per hour. The atmosphere in the two partially filled zones is a mixture essentially of nitrogen and oxygen. The oxygen level in the partially filled zones is given in percent by volume based on the volume of the atmosphere in the each partially filled zone. The resin is extruded in the form of pellets having the following nominal dimensions: ⅛ inch diameter by ⅛ inch long cylinders. The oxygen levels, bubble stability, and dart drop are set forth in Table II:

TABLE II

| example | feed zone (percent by volume) | vent zone (percent by volume) | bubble stability | dart drop (grams per mil) |
|---|---|---|---|---|
| 1 | 9 | 0 | very poor | — |
| 2 | 9 | 9 | excellent | — |
| 3 | 6 | 0 | very poor | 195 |
| 4 | 5 | 5 | good | 225 |

Notes to above Tables:

1. Resin properties for second reactor: these are theoretical values based on the assumption that the second reactor copolymer is produced independently.

2. Density is measured by producing a plaque in accordance with ASTM D-1928, procedure C, and then testing as is via ASTM D-1505. The density is reported in gram per cubic centimeter.

3. Melt Index (g/10 min) is determined under ASTM D-1238, Condition E. It is measured at 190° C. and reported as grams per 10 minutes.

4. Flow Index is determined under ASTM D-1238, Condition F. It is measured at 10 times the weight used in the melt index test above.

5. Melt flow ratio is the ratio of flow index to melt index.

6. The bulk density of each of the resins (not the blend) is given in pounds per cubic foot.

7. Split ratio (wt %): This is the percent by weight of each polyethylene in the blend based on the weight of the blend.

8. The molecular weight distribution is performed via Size Exclusion Chromatography using a Waters™ 150C with trichlorobenzene as solvent at 140 degrees C with a broad molecular weight distribution standard and broad molecular weight distribution calibration method.

9. Bubble stability is explained above and is determined visually.

10. Dart drop strength is measured in accordance with ASTM D-1709. The dart drop is reported in grams for a stated film thickness. The film tested has a gauge of 1.0 mil and is produced from the pellets made above under the following extrusion conditions: 50 mm Alpine™ extrusion line, 100 millimeter die diameter, 1.0 millimeter die gap, 4:1 blow up ratio, 36 inch FLH: 8.0 pounds per hour per inch die rate, barrel temperature (in degrees F) 380/390/400/400, adapter die temperature (in degrees F) 400/400/400.

I claim:

1. A process for the extrusion of polyethylene having a broad molecular weight distribution wherein the polyethylene is prepared in pellet form, said extrusion taking place in a pelletizing extruder having one or more zones essentially filled with polyethylene and two or more zones partially filled with polyethylene comprising (i) introducing the polyethylene into the extruder at a temperature sufficient to melt the polyethylene; (ii) introducing a mixture of an inert gas and oxygen into each partially filled zone wherein the mixture contains about 1 to about 21 percent by volume oxygen based on the volume of the gaseous mixture; (iii) passing the molten polyethylene through each zone at melt temperature; and (iv) extruding the polyethylene into pellets and cooling same.

2. The process defined in claim 1 wherein the gaseous mixture introduced into each partially filled zone is about 1 to about 4 percent by volume oxygen.

3. The process defined in claim 1 wherein the polydispersity of the polyethylene is in the range of about 2 to about 44.

4. The process defined in claim 1 wherein the melt temperature is in the range of about 140 to about 320 degrees C.

5. The process defined in claim 1 wherein the polyethylene is an in situ blend of two or more ethylene polymers.

6. The process defined in claim 1 wherein the amount of oxygen introduced into each partially filled zone is the same or different.

7. A process for the extrusion of an in situ blend of polyethylenes wherein the polyethylene blend is prepared in pellet form, said extrusion taking place in a pelletizing extruder having one or more zones essentially filled with polyethylene and two or more zones partially filled with polyethylene, comprising (i) introducing into the extruder a polyethylene blend having a polydispersity in the range of about 10 to about 30 at a temperature sufficient to melt the polyethylene blend, said temperature being in the range of about 160 to about 280 degrees C; (ii) introducing a mixture of an inert gas and oxygen into each partially filled zone wherein the mixture contains about 1 to about 4 percent by volume oxygen based on the volume of the gaseous mixture; (iii) passing the molten polyethylene blend through each zone at melt temperature; and (iv) extruding the polyethylene blend into pellets and cooling same.

8. The process defined in claim 7 wherein the partially filled zones are a feed section and one or more vent sections.

9. The process defined in claim 7 wherein about 20 to about 80 percent of the partially filled zones, on a volume basis, contain polyethylene.

10. The process defined in claim 7 wherein the amount of oxygen introduced into each partially filled zone is the same or different.

* * * * *